United States Patent [19]

Anderson et al.

[11] Patent Number: 5,655,695
[45] Date of Patent: Aug. 12, 1997

[54] REMOVABLE BICYCLE RACKET HOLDER

[75] Inventors: Gregory B. Anderson; Theoplis Jarvis, both of Chicago, Ill.

[73] Assignee: Eitam Corporation, Chicago, Ill.

[21] Appl. No.: 526,444

[22] Filed: Sep. 11, 1995

[51] Int. Cl.⁶ .................... B62J 7/00; B62J 7/08; B62J 11/00
[52] U.S. Cl. .............. 224/431; 224/435; 224/422; 224/441; 224/919; 206/315.1
[58] Field of Search ............... 224/412, 419, 224/422, 425, 426, 428, 431, 433, 434, 435, 438, 439, 440, 441, 447, 448, 449, 443, 445, 446, 32 R, 32 A, 919, 506; D12/409, 410; 206/315.1, 315.9; 220/315, 334, 338, 342, 323, 326

[56] References Cited

U.S. PATENT DOCUMENTS

| | | | |
|---|---|---|---|
| D. 247,775 | 4/1978 | Watson-O'Hara | D12/410 |
| D. 275,190 | 8/1984 | Gevert | D12/410 |
| 2,783,927 | 3/1957 | Harley | 224/435 |
| 3,013,814 | 12/1961 | Becks | 224/425 |
| 4,044,934 | 8/1977 | Peters | 224/428 |
| 4,281,520 | 8/1981 | Norwood | 62/457.4 |
| 4,311,223 | 1/1982 | Stein | 206/315.9 |
| 4,349,120 | 9/1982 | DiNardo | 220/338 |
| 4,396,135 | 8/1983 | Lundgren | 224/425 |
| 4,588,114 | 5/1986 | Lebaron et al. | 224/435 |
| 4,762,255 | 8/1988 | Dunn | 224/428 |
| 4,967,924 | 11/1990 | Murofushi et al. | 220/338 |
| 5,106,002 | 4/1992 | Smith et al. | 224/506 |
| 5,114,060 | 5/1992 | Boyer | 224/443 |
| 5,271,540 | 12/1993 | Katz et al. | 224/435 |
| 5,272,832 | 12/1993 | Marshall et al. | 220/326 |

FOREIGN PATENT DOCUMENTS

| | | | |
|---|---|---|---|
| 245541 | 11/1987 | European Pat. Off. | 224/32 A |
| 4125751 | 4/1993 | Germany | 224/32 R |
| 2048659 | 12/1980 | United Kingdom | 224/32 R |

*Primary Examiner*—Henry J. Recla
*Assistant Examiner*—Gregory M. Vidovich
*Attorney, Agent, or Firm*—Knechtel, Demeur & Samlan

[57] ABSTRACT

A bicycle racket holder attachable to a bicycle frame which has a rigid shell for receiving the racket. The shell has two halves which are connected by a hinge. An adapter plate or adapter frame is firmly affixed to a bicycle frame. The shell can be attached to or removed from the adapter plate or frame only with the shell in the open position. With the shell closed and locked, the shell cannot be removed from the adapter plate or frame thus securing it and the racket to the bicycle. The shell can selectively be removed and used as a protective carrying case for the racket.

15 Claims, 3 Drawing Sheets

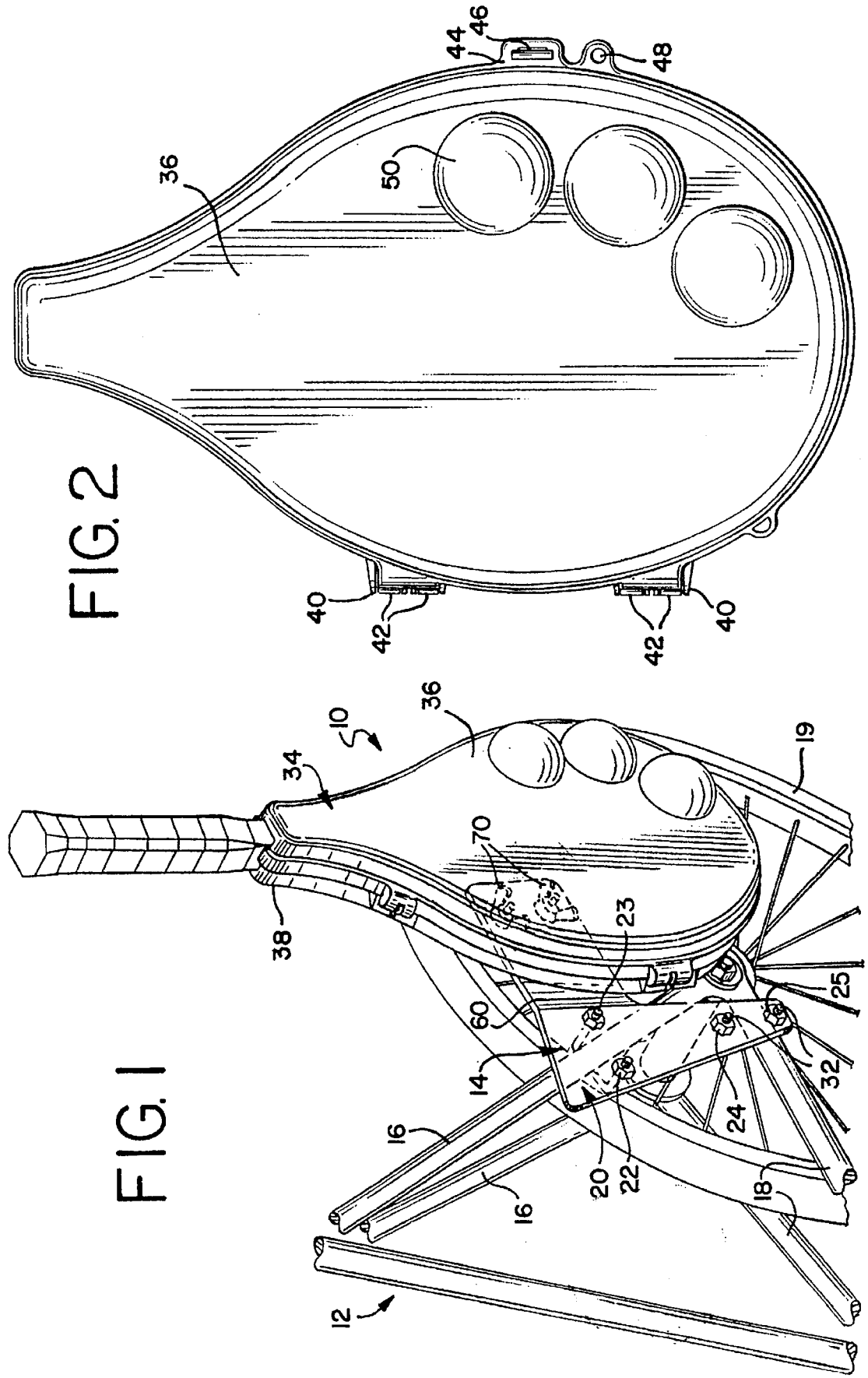

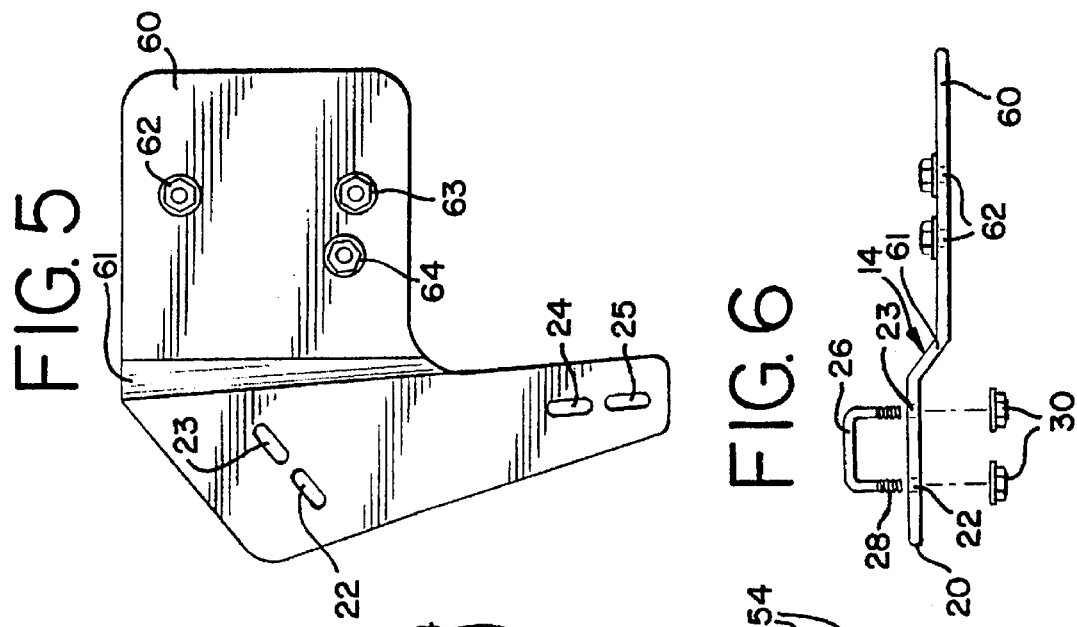
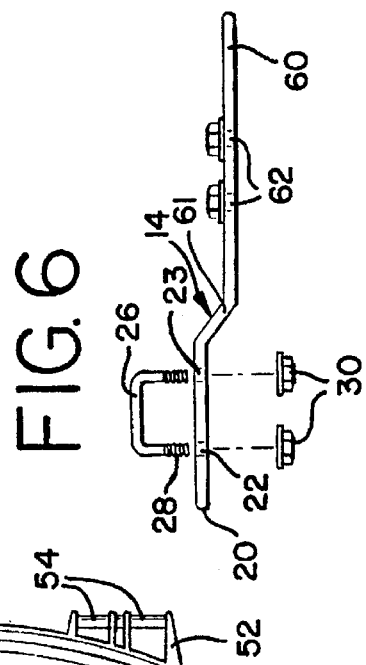
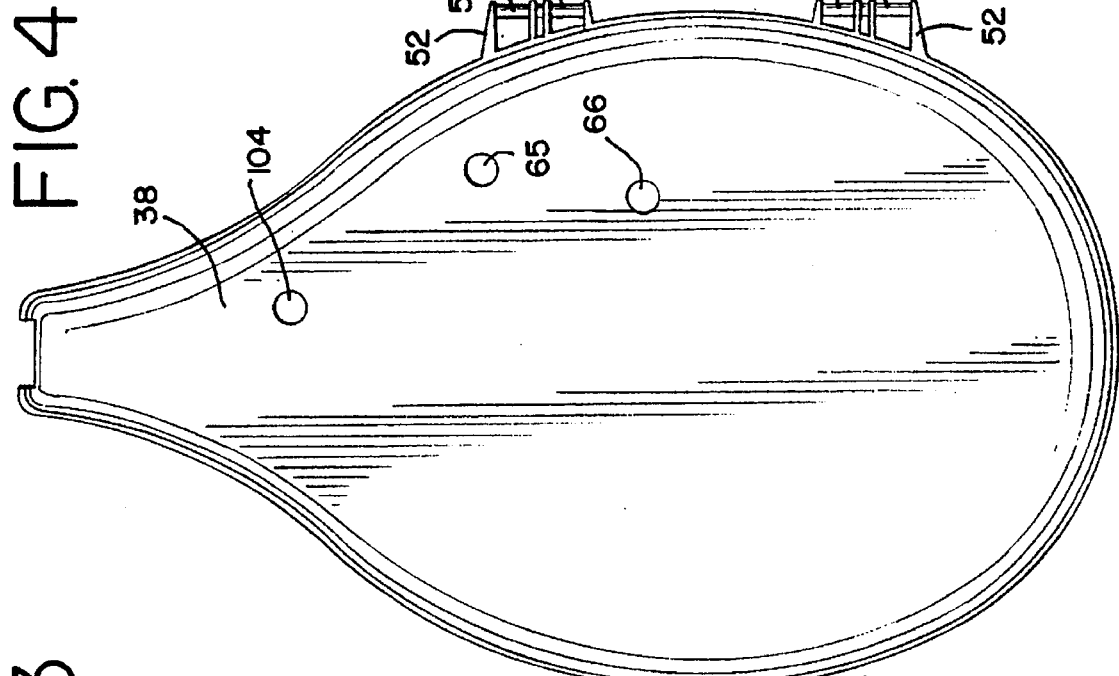
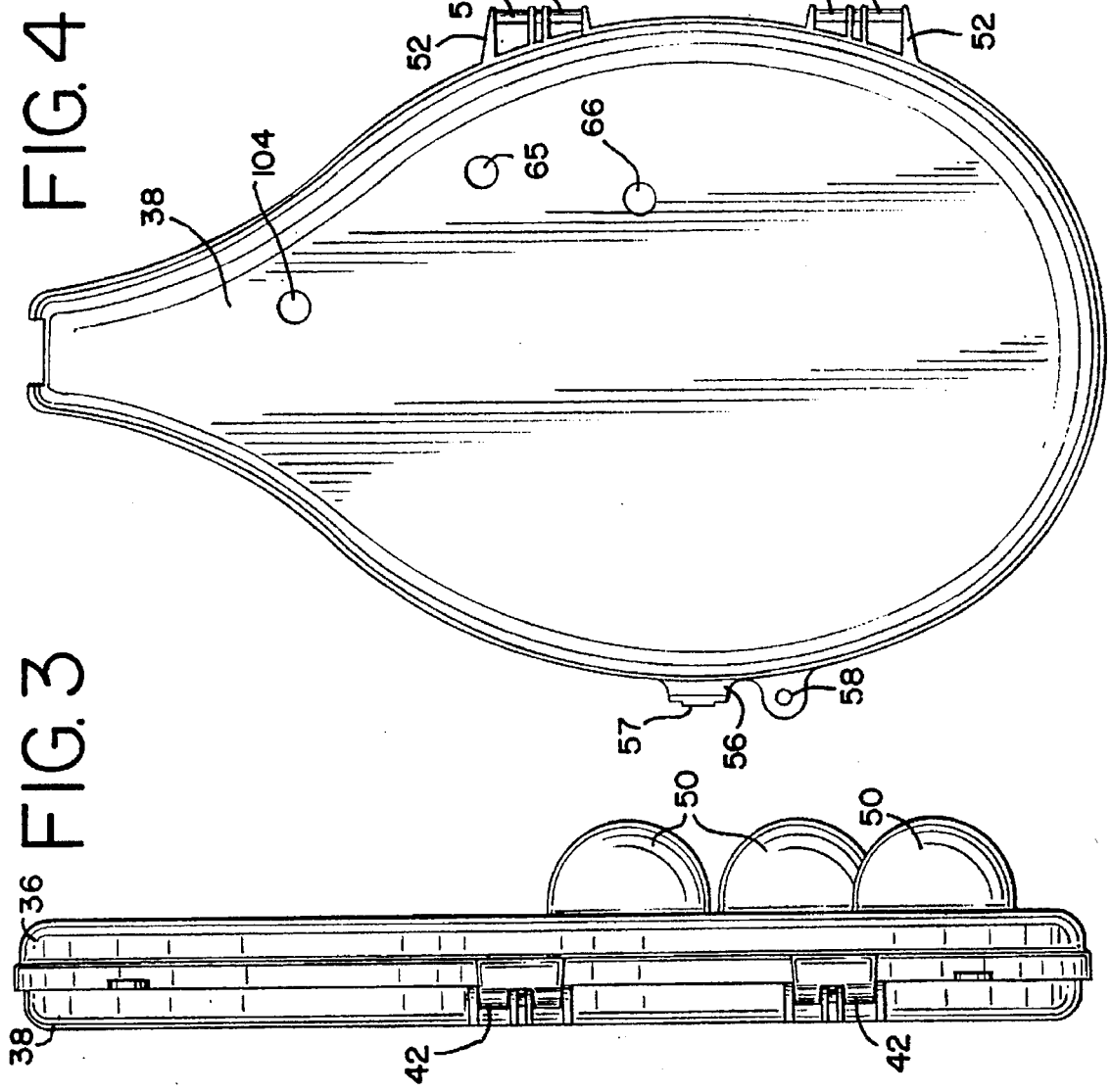

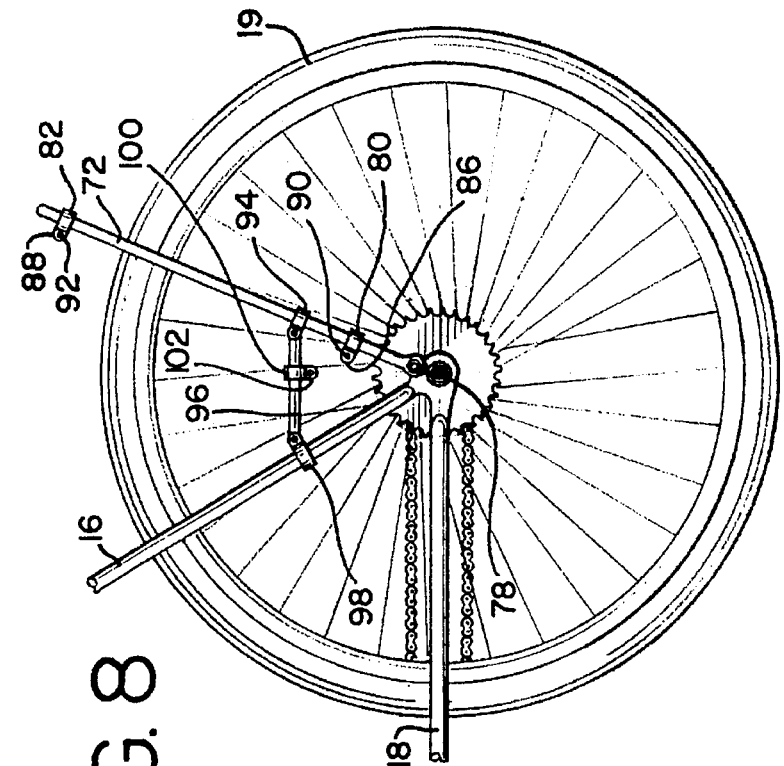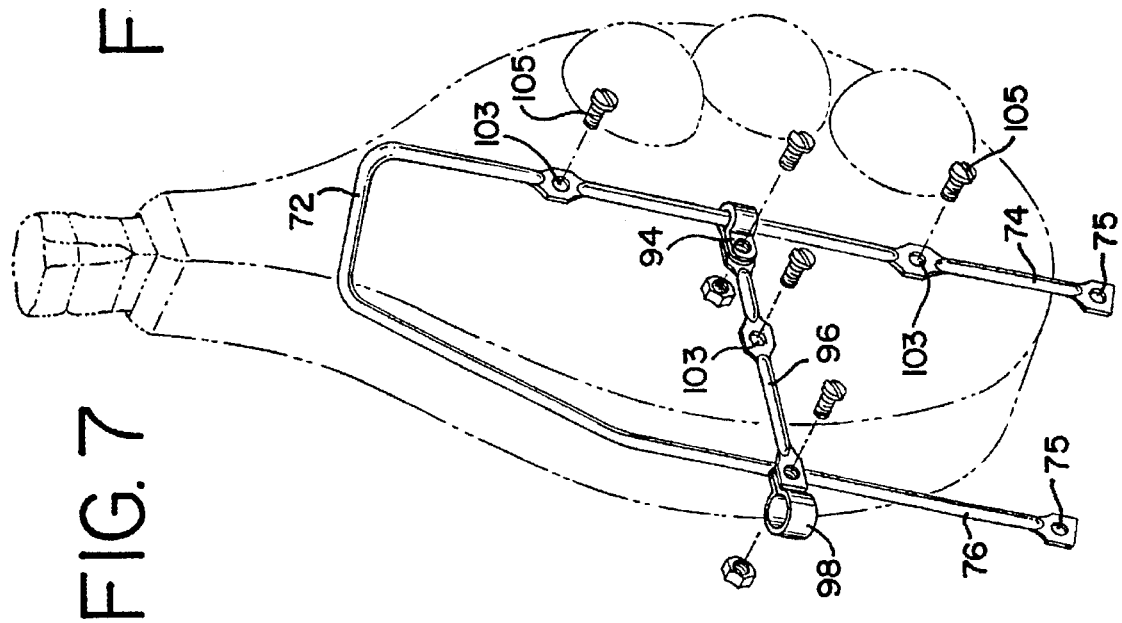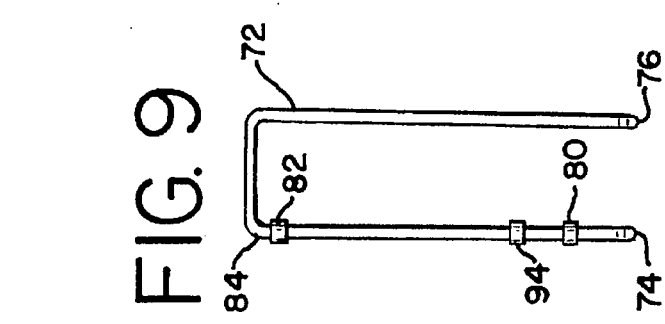

REMOVABLE BICYCLE RACKET HOLDER

BACKGROUND OF THE INVENTION

This invention relates to a racket carrier and, in particular, to a racket carrier for a bicycle which is capable of being securely locked to the bicycle and selectively removed by the user.

A number of carriers have been developed in the past which are designed to hold a tennis racket while riding a bicycle. As any person that has attempted to carry a tennis racket and balls while riding a bicycle can appreciate, it is difficult to hold the racket, balls and steer the bicycle, especially if the bicycle is the type that utilizes hand brakes. Furthermore, it presents a safety hazard for the user in trying to steer the bicycle while carrying the racket and balls.

Various types of holders or carriers have been designed. For example, in U.S. Pat. No. 4,762,255, entitled *Bicycle Equipment Carrier Apparatus*, there is an equipment carrier which includes a support section mounted to the bicycle frame and a web or basket in which is deposited the items to be held. However, this device is not particularly well suited to hold a racket therein nor can the items held within the receptacle be secured by a locking mechanism. Furthermore, the carrier is not easily removed from the bicycle frame.

U.S. Pat. No. 4,044,934, entitled *Tennis Racket and Ball Carrier for Bicycles*, shows a tennis racket press which is attached to a bracket member in order that the tennis racket and a can of tennis balls may be mounted to a bicycle frame. There are several shortcomings with this design. First, it can only be used with an old fashioned tennis press which is found on wooden rackets and not on the newer composite designs. Secondly, it does not provide for a means by which the racket can be locked to the bicycle frame.

Another device is illustrated in U.S. Pat. No. 3,968,912, entitled *Ball and Racket Carrier*. This device provides for a mounting mechanism on the handle bars of a bicycle in which a tennis racket and can of balls can be supported. An obvious shortcoming is that the racket is in the way and can possibly hit the face of the user while peddling. Furthermore, the racket cannot be locked to the carrier and, thus, can be easily stolen.

Another device is illustrated in U.S. Pat. No. 4,396,135, entitled *Tennis Racket Carrier for Bicycles*. This device provides for mounting two tennis rackets parallel to each other on a mounting bracket attached to the bicycle frame. The mounting is between the handle bars and the bicycle seat. One obvious problem is that this device could not be easily adapted to use on bicycles not having a cross member disposed between the bicycle seat and handle bars. Furthermore, the tennis racket carrier does not provide for a means to lock the rackets to the carrier and/or the bicycle. Thus, the rackets can easily be stolen.

Yet, another example is illustrated in U.S. Pat. No. 5,271,540, entitled *Combination Bicycle Rack and Side Carrier*. This device shows a carrier which can be mounted to a U-shaped bracket which in turn is mounted to the bicycle. However, the container is not particularly Well adapted for a tennis racket and does not provide a readily available means to lock the racket to the carrier.

There are several evident problems with all of the prior devices. First, none of them protect the racket while it is in the stored position mounted to the bicycle. Second, the racket cannot be locked to the carrier and in turn to the bicycle frame so that if the bicycle is left unattended, a would-be thief cannot easily remove the racket from the carrier. Third, none of the prior art illustrates a device which provides for a locking mechanism whereby the racket can be locked to the carrier yet easily removed from the carrier by the user. Lastly, none of the prior art devices illustrate a carrier which can hold and protect a racket when it is mounted to the bicycle yet be selectively removed from the bicycle to provide a portable carrier for the racket.

OBJECTS AND ADVANTAGES

It is therefore an object of the invention to provide a bicycle equipment carrier apparatus which will securely hold a racket to the bicycle in such a position that it will not interfere with the user's operation of the bicycle. It is a related object to provide a racket carrier which will enable the operator to operate the bicycle without having to hold a racket or balls in the operator's hands while operating the bicycle.

It is a further object of the invention to provide a racket carrier which will protect the racket while it is mounted to the bicycle. It is a related object to provide a protective carrier which can be removed from the bicycle yet still hold the racket therein as a portable protective carrier.

Yet, another object is the object of providing a racket carrier which can be selectively attached to or removed from the bicycle frame. A related object is to have the racket carrier capable of being locked to the bicycle frame such that the carrier cannot be removed from the bicycle without unlocking the locking mechanism.

It is yet another object to provide a ridged shell which receives the racket to provide protection to the racket with the shell being hinged to allow for easy insertion or removal of the racket.

Still another object is the object of providing a racket carrier which has means for not only holding the racket but for holding associated balls therein.

SUMMARY OF THE INVENTION

Applicant's invention comprises a racket holder which is designed for attachment to a bicycle frame. The holder is comprised of a rigid molded shell which receives the racket. The rigid shell is comprised of two halves which are hinged together along one side. In one embodiment, the shell is mounted to an adapter plate which in turn is attached to the bicycle frame. In a second embodiment, the shell is mounted to an adapter frame which in turn is attached to the bicycle frame and rear hub. The means to attach the rigid shell to the adapter plate or frame are only accessible when the shell is in the opened position. When the shell is closed and locked, access to the fastening means is prohibited. Thus, the shell is locked to the bicycle frame until such time as the shell can be opened. The shell can be selectively removed from the adapter plate or adapter frame such that it can provide a rigid protectable carrying case for the racket separate and apart from its function as being a bicycle racket holder. Furthermore, in one embodiment of the invention, the handle of the tennis racket extends from the holder through an opening in the holder when it is in the fully closed position. This facilitates carrying of the racket holder when it is detached from the bicycle frame as the handle itself is easy to grip.

BRIEF DESCRIPTION OF THE DRAWINGS

Other objects, features and advantages will occur from the following description of the preferred embodiment and the accompanying drawings in which:

FIG. 1 is a perspective view of the inventive racket holder affixed to the rear portion of the bicycle frame.

FIG. 2 is a front elevational view of the rigid shell.

FIG. 3 is a side elevation view of the rigid shell.

FIG. 4 is a rear elevation view of the shell.

FIG. 5 is a side elevation view of the adapter plate used to attach the shell to the bicycle frame.

FIG. 6 is an exploded top plan view of the adapter plate and mounting clamp used to fasten the plate to the bicycle frame.

FIG. 7 is a perspective view of an alternate embodiment of a racket holder which illustrates an adapter frame which is mounted to the rear wheel hub and bicycle frame.

FIG. 8 is a side elevational view of a second alternate embodiment of the racket holder which is similar to the racket holder of FIG. 7 but provides for alternate means to attach the adapter frame to the shell.

FIG. 9 is an end view of the adapter frame of FIG. 8.

FIG. 10 is an enlarged end view of the collar and fastener used in FIG. 10.

FIG. 11 is an enlarged side view of the collar and fastener shown in FIG. 10.

DESCRIPTION OF THE PREFERRED EMBODIMENT

Turning first to FIG. 1, there is illustrated a bicycle racket holder 10 which is adapted for mounting to a bicycle frame 12 according to the present invention. It is noted that the tennis racket handle extends from the holder through an opening once it is placed in the holder and closed (handle and opening not numbered). This is accomplished by using an adapter plate 14 which is attached to a vertical rear wheel bicycle frame piece 16 and horizontal rear wheel bicycle frame piece 18. The frame pieces 16 and 18 retain and are supported by the wheel 19.

As seen in FIGS. 1 and 6, the adapter plate 14 has a frame mounting portion 20 having two pairs of holes 22, 23 and 24, 25. As seen in FIG. 6, the pair of holes 22, 23 receives a C-shaped clamping member 26 which has threaded ends 28. The vertical rear wheel bicycle frame piece 16 will pass through and be received between the C-shaped clamping member 26 and the frame mounting portion 20. Lock nuts 30 will engage the threaded ends 28 to firmly hold the vertical rear wheel bicycle frame piece 16 between the clamping member 26 and the frame mounting portion 20. A second C-shaped clamping member partially shown in FIG. 1 will receive the horizontal rear wheel bicycle frame piece 18 between itself and the frame mounting portion 20. A pair of fasteners or lock nuts 32 will engage the end of this second C-shaped clamp in a similar manner as was described above for the C-shaped clamping member 26. The only difference is that the second C-shaped clamp is in a vertical orientation passing through holes 24, 25 as opposed to the horizontal orientation of the first clamp. As can be more clearly seen in FIG. 5, the holes 22, 23 and 24, 25 are actually cut as elongated slots to provide adjustability of locating the horizontal clamp 26 and the related vertical clamp. Thus, the adapter plate 14 can be mounted to the rear wheel bicycle frame pieces of most bicycles and provides for great flexibility of the angle between the vertical bicycle frame piece 16 and horizontal bicycle frame piece 18.

The racket holder 10 is further comprised of a rigid shell 34. The shell has two halves, a front half 36 and a rear half 38. As seen in FIG. 2, the front half of the shell 36 has a pair of hinge members 40 with a pair of semi-circular clip elements 42. Located on the side of the front shell opposite the hinge members is a tab 44 which has a slot 46. There is also a shackle receiving hole 48 in the tab 44. There are three semi-circular projections 50 which are dimensioned to be slightly larger than the size of the ball for which the racket holder is designed. For example, if the racket holder 10 is to hold a tennis racket, the dimension of the semi-circular protrusion 50 will be slightly larger than the diameter of a tennis ball.

Looking at FIG. 4, we can see the rear half 38 of the shell 34. There are a complimentary set of hinge members 52 having clip-receiving pins 54. The clip element 42 of hinge members 40 will lock around the pins 54 to provide a complete hinge about which the front half 36 can pivot from the rear half 38. A complimentary tab 56 has a latching tab 57 which is received into the slot 46. A shackle receiving hole 58 will align with the shackle receiving hole 48 when the two halves are closed together. Thus, a lock can have its shackle placed through the aligned receiving holes 48 and 58 to lock the shell in a closed position. The locking tab 57 will engage with the slot 46 to hold the shells together until such time as the user desires to open the halves at which point they can push the locking tab 57 out of engagement with the slot 46 to allow the shells to pivot apart provided that there is no locking means passing through the holes 48, 58.

As seen in FIG. 3, the edge of the front half 36 extends over the edge of the rear half 38 to provide a water-resistant seal. FIG. 3 further illustrates how the clip element 42 engages the clip-receiving pins 54 to form the hinge means.

Once again, looking at FIGS. 5 and 6, we can see that the adapter plate further has a shell mounting portion 60. The shell mounting portion 60 is connected to the frame mounting portion of the adapter plate by means of an angle transition piece 61. There are a pair of holes 62, 63 which are vertically aligned with each other. Adjacent to the lower hole 63 is another hole 64.

The rear shell 38 has a pair of upper and lower disposed holes 65, 66 which are separated from each other the same distance as the holes 62, 63 on the shell mounting portion of the adapter plate 14.

To mount the shell 34 to the adapter plate 14 the shell must first be opened. The holes 65, 66 are aligned with the holes 62 and 63 or 62 and 64 on the shell mounting portion 60 of the adapter plate 14. A pair of bolts are passed through the adapter plate 14, through the holes 65 and 66 in the rear half 38 of the shell, and fasteners such as wing nuts 70 (FIG. 1) are tightened onto the bolts. Thus, the rear half 38 of the shell is firmly affixed to the adapter plate 14. The racket is inserted into the shell 34 and the front half 36 is closed and engages the rear half 38. The locking tab 57 will snap into the slot 46 to keep the shell 34 closed. If the user desires to restrict removal of the shell 34 from the adapter plate 14, he must only insert a lock through the holes 48, 58. Thus, if the shell cannot be opened, a would-be thief does not have accessibility to the wing nuts 70 and thus cannot remove the shell 34 from the adapter plate 14. By using locking non-removable fasteners for the nuts 30 or 32, the adapter plate 14 is securely mounted to the bicycle frame. Thus, without the proper special tools to remove the fasteners 30 and 32 the shell 34 cannot be removed from the adapter plate 14. Once the shell 34 is opened, the operator can, if he so chooses, easily remove the shell from the shell mounting portion 60 releasing the wing nuts 70. In this instance, the shell 34 can function as a protective carrying case for the racket.

Two alternate embodiments which provide for greater rigidity when attaching the shell 36 to the bicycle frame are illustrated in FIGS. 7 and 8. The alternate embodiments are substantially the same except for the means to fasten the shell 36 to the bicycle frame. Therefore, wherever possible, the same part reference numbers will be used. In the embodiment shown in FIG. 8, a U-shaped frame member 72 has its lower ends 74, 76 mounted onto the hub 78 of the rear wheel 19. This can be in a conventional manner such as either a yoke or by having the hub pass through holes 75 in the lower ends 74, 76. There are a pair of clamps 80, 82 which encircle and are fastened near the lower end 74 and upper end 84 of the frame member 72. The clamps 80, 82 have protruding tabs 86, 88 which have holes 90, 92 therein. There is another clamp 94 mounted to the frame 72 between the clamps 80, 82. Affixed to the clamp 94 is a horizontal bracing member 96. The end opposite the clamp 94 is affixed to clamping piece 98 which is mounted on bicycle frame piece 16. A collar 100 mounted on the bracing member 96 has a hole 102 on a protruding tab. Once the U-shaped frame 72 is connected to the vertical frame 16 by means of the plurality of clamps and mounted to the rear wheel hub, the shell 34 can be attached.

In the embodiment shown in FIG. 7, clamps 80, 82 and collar 100 are eliminated and instead the frame 72 and bracing member 96 are provided with holes 103. Clamps 94 and 98 mount the bracing member 96 to the frame 72 as in the FIG. 8 embodiment. The lower ends 74, 76 are mounted to the wheel hub.

In the alternate embodiments, the rear half 38 of the shell 34 is provided with an additional hole 104. (See FIG. 4). In the device shown in FIG. 7, the holes 66, 65 and 104 in the shell 34 will align with holes 103 in the frame 72 and bracing member 96. In the device shown in FIG. 8, the holes 66, 65 and 104 will align with holes 90, 102 and 92 in clamp 80, collar 100 and clamp 82. Locking bolts are passed through the holes into the inside of the rear half 38 of the shell 34. Wing nuts 70 will fasten the shell in place. Preferably the locking bolts are designed so that they cannot be removed without opening the shell 34 and removing the wing nuts 70. These embodiments provide three fastening points as compared to only two in the first described embodiment. Thus, it is more securely fastened to the bicycle frame.

Another fastener means is illustrated in FIGS. 9 and 10. The clamps 80, 82 and collar 100 are provided with a threaded fastener 106 integral therewith. This is preferable to using locking bolts as they are more secure from being removed by an unauthorized person. These threaded fasteners line up with holes 66, 65 and 104 in the rear half 38. As the threaded fasteners do not rotate, they cannot be removed from the wing nuts 70 unless the user has the shell 34 open and can turn the wing nuts 70 removing them from the fasteners 106. This same concept can be used in the device shown in FIG. 7 by having threaded fasteners welded or otherwise integral with the frame 72 or bracing member 96.

The shell 34 is preferably made of a high-impact injection-molded plastic material. In this manner, the front half 36 can be integrally formed with the hinge members 40, tab 44 and semi-circular protrusions 50. Likewise, the rear half 38 can be integrally formed with its hinge members 52 and tab 56. The plastic can be colored for any color desired by the user. Additionally, foam padding can be added to the inside of the front and rear halves 36 and 38 to cushion and protect the racket.

The shell 34 can also be removed from the bicycle and function separately as a protective carrying case. A strap can be attached to it so that it can be carried over the user's shoulder.

Thus, there has been provided a removable bicycle racket holder that fully satisfies the aims, objects and advantages as set forth above. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A bicycle racket holder attachable to a bicycle frame comprising:

a rigid shell for receiving the racket, the shell having two halves adapted for engaging each other to form a container;

hinge means on each of the two halves for allowing the two halves to pivot between opened and closed positions;

an adapter plate;

mounting means for firmly attaching the adapter plate to the bicycle frame;

fastening means for attaching one half of the shell to the adapter plate, the fastening means accessible only when the shell is in the opened position;

releasable latching means for holding the shell halves closed and operable to release the shell halves from each other to permit the shell halves to pivot to their opened position;

locking means for locking the two shell halves together when in their closed position thereby prohibiting access to the fastening means to prohibit removal of the shell from the adapter plate; and an opening within the shell wherein when a racket is placed within the shell and the shell is in the closed position, the racket handle extends through said opening.

2. The racket holder of claim 1 wherein the shell is made of impact-resistant plastic.

3. The racket holder of claim 2 and further comprising ball-receiving pockets molded into the shell half opposite the shell half attached to the adapter plate, wherein when the racket is properly placed within the shell and the shell is in the closed position, any tennis balls carried within the shell are only received within said pockets.

4. The racket holder of claim 1 and further comprising a tab on one shell half and a mating slot on the other shell half to releasably engage the tab to selectively hold the shell halves in the closed position.

5. The racket holder of claim 1 and further comprising padding in each shell half to protect the racket.

6. The racket holder of claim 1 wherein the hinge means are integrally formed with the shell halves.

7. A bicycle racket holder attachable to a bicycle frame comprising:

a rigid shell for receiving the racket, the shell having halves adapted for engaging each other to form a container;

hinge means on each of the two halves for allowing the two halves to pivot between opened and closed positions;

a supporting frame member;

means for firmly attaching the supporting frame member to a bicycle frame;

fastening means for attaching one half of the shell to the supporting frame member, the fastening means accessible only when the shell is in the opened position;

releasable latching means for holding the shell halves closed and operable to release the shell halves from each other to permit the shell halves to pivot to their opened position;

locking means for locking the two shell halves together when in their closed position thereby prohibiting access to the fastening means to prohibit removal of the shell from the adapter plate; and an opening within the shell wherein when a racket is placed within the shell and the shell is in the closed position, the racket handle extends through said opening.

8. The racket holder of claim 7 wherein the supporting frame member is a U-shaped frame which straddles a wheel on the bicycle.

9. The bicycle racket holder of claim 8 wherein the means for firmly attaching the U-shaped frame member to a bicycle frame comprises a bracing member that has one end mounted to the supporting frame and the other end mounted to the bicycle frame, and means on the U-shaped frame to attach it to a wheel hub which is connected to the bicycle frame.

10. The racket holder of claim 9 wherein the fastening means comprises at least two threaded fasteners rigidly attached to the U-shaped frame whereby the threaded fasteners are not free to rotate, and complimentary nuts received by the threaded fasteners in locking engagement, the nuts accessible only when the shell is in the opened position.

11. The racket holder of claim 7 wherein the shell is made of impact-resistant plastic.

12. The racket holder of claim 7 and further comprising ball-receiving pockets molded into the shell half opposite the shell half attached to the supporting frame, wherein when the racket is properly placed within the shell and the shell is in the closed position, any tennis balls carded within the shell are only received within said pockets.

13. The racket holder of claim 7 and further comprising a tab on one shell half and a mating slot on the other shell half to releasably engage the tab to selectively hold the shell halves in the closed position.

14. The racket holder of claim 7 and further comprising padding in each shell half to protect the racket.

15. The racket holder of claim 7 wherein the hinge means are integrally formed with the shell halves.

\* \* \* \* \*